Patented May 20, 1947

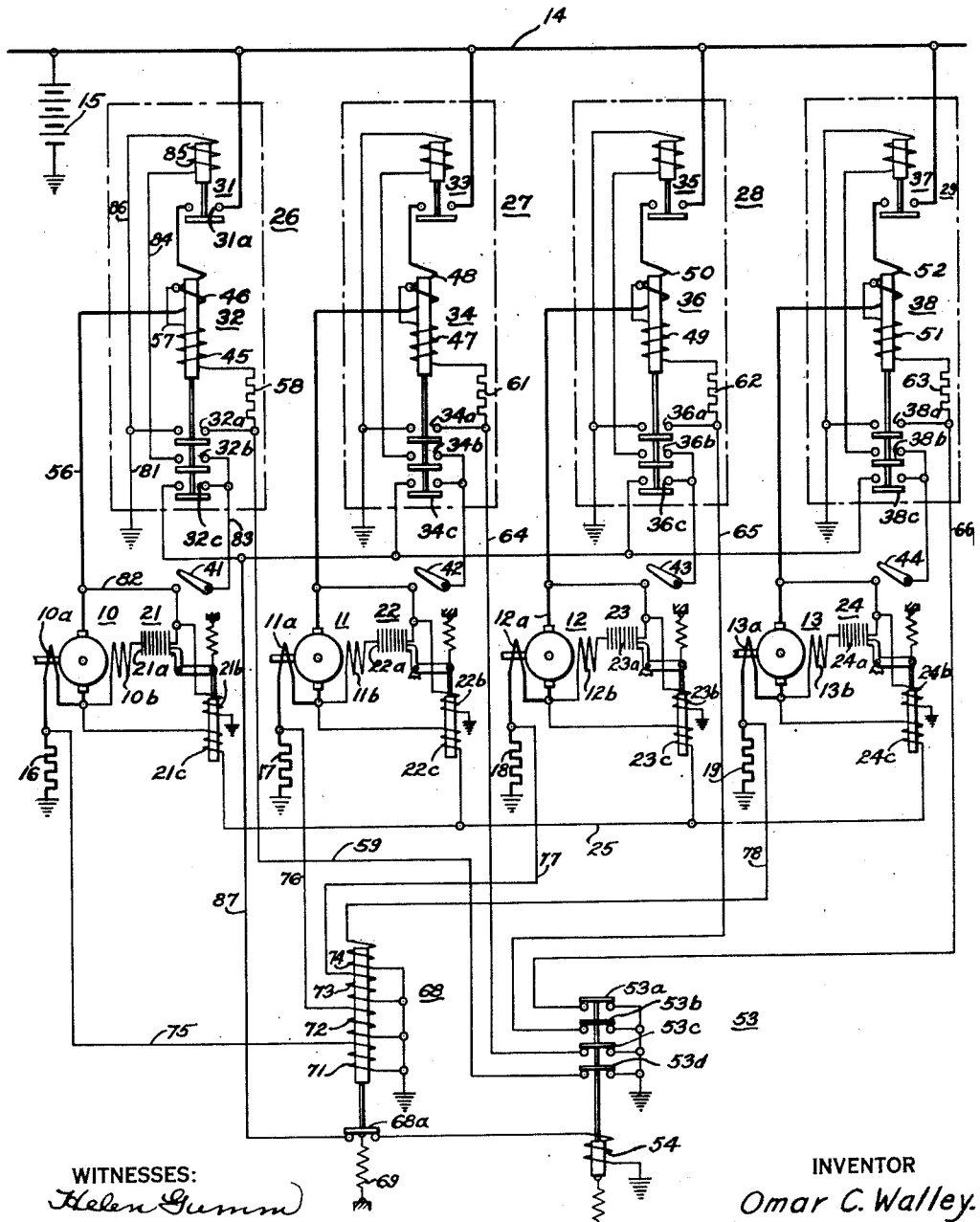

2,420,922

UNITED STATES PATENT OFFICE 2,420,922

CONTROL SYSTEM

Omar C. Walley, Lima, Ohio, assignor to Westinghouse Electric Corporation, East Pittsburgh, Pa., a corporation of Pennsylvania Application August 2, 1944, Serial No. 547,691

10 Claims. (Cl. 171—118)

My invention relates, generally, to control systems and, more particularly, to a system for controlling the operation of a plurality of generators disposed to operate in parallel circuit relation to supply power to a common load or bus on an airplane or the like.

Heretofore, electrical power for operating electrical equipment and charging storage batteries on multi-engine airplanes has been supplied by a number of low voltage direct-current generators driven by the engines of the plane and operated in parallel circuit relation, each generator being equipped with a voltage regulator and a current control in the form of a relay switch including an electrically operated switch or contactor for connecting the generator to the load bus and/or a battery and a reverse current relay or cutout. The paralleling operation of the generators in a system of this kind was controlled by the voltage regulators. Each regulator was provided with an equalizer coil cooperating with its main coil, and each equalized coil was connected to one terminal of its associated generator and to a common equalizing bus to cause the generators to balance or divide the total load.

This type of paralleling control is not satisfactory under all operating conditions. It is reasonably effective under medium and high load conditions, it is not effective under light load conditions or no-load conditions which are the normal operating conditions of a system of this kind. The medium and heavy load conditions are only encountered during certain infrequent operations of the plane such as when landing and taking off. Such unsatisfactory operation of the paralleling control has resulted from a feedback condition between the generators under light load conditions due to the action of the regulators which causes the reverse current cutouts or relays to operate quite frequently, thus shortening their operating life in some instances to a few hours and requiring excessive maintenance.

Accordingly, it is an object of my invention to provide for eliminating the unstable operating condition of a power supply system of the character described.

A more specific object of my invention is to provide for stabilizing the operation of a system of the character described under all operating conditions including light or no-load conditions.

Another object is to provide in a system of the character described for so controlling the connection of the generators to the load bus that only one generator will be connected during such time as the load is below a predetermined value so that parallel operation of the generators will occur only under such conditions that the paralleling control of the regulators is effective.

A further object of my invention is to provide for controlling the relay switches of the several generators in a system of this type so that only one of these switches, that is, the relay switch associated with the generator that builds up to normal voltage first, will be effective to connect its associated generator to the load or bus during such time as the total load is below a predetermined value.

Another object is to provide, in a power system of this kind, for utilizing a load dispatching relay and an auxiliary trip relay for controlling the functioning of the relay switches of the several generators so that only one generator is connected to the load or bus under light load conditions, as determined by the adjustment of the auxiliary trip relay.

A further object of my invention is to provide, in a system of the character described, for controlling the relay switches of the several generators by means of a load dispatching relay which functions to render the remaining relay switches ineffective to connect their associated generators to the load in response to the operation of the first relay switch to operate, and for controlling the functioning of the load dispatching relay by an auxiliary trip relay responsive to the load currents of the generators to cause the load dispatching relay to again render the relay switches of the remaining generators effective when the load increases to a predetermined value.

A still further object of my invention is to provide for controlling the load dispatching relay by an auxiliary trip relay responsive to the load current of a connected generator to actuate the load dispatching relay to again render the remaining relay switches effective to connect their associated generators as the total load increases, and thereafter responsive to the combined loads of the generators for so controlling the load dispatching relay that only one generator will remain connected to the load when the load current again decreases below said predetermined value.

Another object of my invention is to provide a load dispatching control for a plurality of direct-current generators driven by separate engines and disposed to supply electric power to a common load having electrically interconnected voltage regulators operable to maintain load division between the several generators so long as the total load current exceeds a predetermined minimum value, and which functions to limit the number of generators which can be connected to the load so long as the load current is below the predetermined minimum value.

In practicing my invention, the connection of the several generators to a common load is so controlled by means of a load dispatching relay and an auxiliary trip relay that only one generator is connected to the load while the load current is below a predetermined value. The load dispatching relay functions to control the main operating circuits of the relay switches individually associated with the generators so that the relay switch of the first generator to build up to normal voltage is operated to connect its associated generator to the load, and the relay switches associated with the other generators are rendered ineffective or non-responsive to the voltages of their generators. The auxiliary trip relay controls the energization of the load dispatching relay in such manner that it is deenergized or released when the load on the connected generator exceeds the predetermined value to again render the relay switches of the other generators which are disconnected effective to connect their associated generators to the load. When the load again decreases below the predetermined value, the auxiliary trip relay is again operated to energize the load dispatching relay to open all of the main operating circuits of the relay switches, but these switches are held closed by holding circuits through their auxiliary contact members. Under such load conditions, the parallel operation of the generators becomes unstable, and the interchange of reverse current therebetween causes their reverse current relays to function to finally disconnect all but one of the generators from the load.

Referring to the single figure of the drawing, there is shown a power supply system comprising a plurality of direct-current generators 10, 11, 12, and 13 for supplying direct-current power to the load bus 14 which may or may not have a battery 15 connected thereto, as shown. The system shown is intended primarily for use on airplanes for supplying power to the electrically operated auxiliaries thereon, although it is to be understood that the system may be used for other purposes.

The generators may be driven by the engines on a plane, not shown, and when so driven, it will be apparent that they will be driven at variable speeds over a comparatively wide speed range depending upon the conditions under which the plane is being operated.

As shown, the generators are of the compound wound type having both series and shunt field windings. Thus, the generators are provided with series field windings 10a, 11a, 12a, and 13a, respectively, and the shunt field windings 10b, 11b, 12b, and 13b, respectively.

The generators have their negative terminals connected to ground through their series field windings and load resistors 16, 17, 18, and 19, respectively. These resistors may be in the form of separate resistance elements as shown, or the resistance necessary may be inherent in the generator connection. The resistance, regardless of its form, is utilized to supply a voltage drop proportional to load current for a purpose which will be described more in detail hereinafter.

The generators are also provided with voltage regulators 21, 22, 23, and 24, respectively, for regulating their output voltages over their operating speed range. These regulators are shown as carbon pile regulators, but it is to be understood that any other suitable type may be used.

The regulators are provided with resistance elements 21a, 22a, 23a, and 24a, respectively, connected in series circuit relation with the shunt field windings of their associated generators. The regulators are provided with main operating windings 21b, 22b, 23b, and 24b connected between ground and the positive terminals of their associated generators. The regulators are also provided with auxiliary windings 21c, 22c, 23c, and 24c, respectively, which are in the form of equalizer windings and which function when connected, as shown, to control the division of load between the generators.

As shown, the equalizer windings each have one terminal connected to the negative terminal of its associated generator, and the other terminals of these windings are connected in a bridge circuit by a common equalizer connection 25 in such manner that upon a predetermined variation in load between the several generators, the regulators are so controlled independently of their main windings 21b, 22b, etc., so as to maintain the desired load division.

In order to provide for controlling the connection of the several generators to the load circuit, a plurality of relay switches 26, 27, 28, and 29, each individual to a generator, are utilized. Each of these relay switches comprises a main contactor and a cutout or reverse current relay. Thus, the switch 26 comprises a main contactor 31 and a reverse current relay 32, the switch 27, a main contactor 33 and a reverse relay 34, the switch 28, a main contactor 35 and reverse current relay 36, and switch 29, a main contactor 37 and reverse current relay 38.

A plurality of manual control switches 41, 42, 43, and 44, each individual to a relay switch, are provided for rendering their associated relay switch effective or ineffective as desired. The closure of any one of switches 41, 42, etc., renders the associated relay switch responsive to the voltage of its generator.

In this instance, each one of the reverse current relays 32, 34, etc., is provided with three sets of contact members, indicated in the case of relay 32 as 32a, 32b, and 32c. The contact members of the other relays 34, 36, and 38 are designated in the same manner.

Each one of the reverse current relays 32, 34, etc., is also provided with the main operating winding and a series holding winding. In the case of relay 32, for example, the main operating winding is indicated at 45, and the series holding winding at 46. The relay 34 has a main winding 47 and a holding winding 48. The relay 36 has a main winding 49 and a holding winding 50. The relay 38 has a main winding 51 and a holding winding 52.

The purpose of the main windings of these relays is to effect the initial operation of the relay, and these windings are cumulative with respect to the series holding windings so that, so long as these windings are energized in the same direction, the relay will remain closed. When the output voltage of any one of the generators decreases below the voltage of the load bus, reverse power current flows through the series holding windings in the opposite direction and causes the reverse current relay to function to disconnect its associated generator from the load bus.

In order to provide for automatically determining the number of generators to be connected to the load bus in accordance with load conditions, a multi-contact load dispatching relay 53 is provided. This relay is provided with normally closed contact members 53a, 53b, 53c, and 53d and an operating winding 54 having one of its terminals connected to ground, as shown.

It will be apparent that each one of the contact members of this relay is individual to a main operating winding of an associated reverse current relay. Thus, contact member 53a is connected to the winding 52 of relay 38, the contact members 53b are connected to the winding 49 of relay 36, the contact members 53c are connected to the winding 47 of relay 34, and contact members 53d are connected to the winding 45 of relay 32.

The opposite terminals of windings 45, 47, etc., are connected to their associated series holding windings 46, 48, etc., as shown. The operating circuit for relay 32, for example, extends from the positive terminal of generator 10 through conductor 56, winding 46, conductor 57, winding 45, resistor 58, conductor 59, and contact members 53d to ground. This circuit is completed through the generator and its series field winding 10a and resistor 16 to ground.

Relays 34, 36, and 38 are provided with similar energizing circuits, their windings 47, 49, and 51 being connected through resistors 61, 62, and 63, respectively, and conductors 64, 65, and 66, respectively, to contact members 53c, 53b, and 53a, respectively, to ground.

In order to control the operation of the load dispatching relay 53 in accordance with the total load current to be supplied, an auxiliary trip relay 68 is provided. This relay is provided with a single set of normally closed contact members 68a and is the type of relay which may be calibrated by means of a suitable spring 69 to open its contact members at a predetermined current value within very narrow limits. The auxiliary trip relay is also provided in this instance with a plurality of separate operating windings 71, 72, 73, and 74, each of which is individual to one of the several generators. It will be observed that the relay windings have one of their terminals connected to a common ground connection and that each winding is connected to the ground circuit of its individual generator. Thus, winding 71 is connected through conductor 75 to a point in the ground circuit of generator 10 intermediate its series field winding 10a and resistor 16. The other windings are connected in a similar manner to their associated generators through conductors 76, 77, and 78, respectively.

It will be readily understood that by means of these connections the relay 68 will respond to or be actuated in accordance with the total load current of the generators. Its function, as will be described hereinafter in more detail, is to control the energization of the load dispatching relay 53.

Assuming now that all of the manual control switches 41, 42, 43, and 44 are closed to render their associated generators effective and that the generators are being brought up to speed by their respective engines, as soon as one of the generators develops a predetermined output voltage its main contactor will be closed to connect it to the load bus.

Under these operating conditions, the load dispatching relay 53 and the auxiliary trip relay 68 are in their normal operating positions, as shown. Since all of the contact members 53a, 53b, etc., of relay 53 are closed, any of the reverse current relays 32, 34, etc., are free to function at any time dependent upon the output voltages of their associated generators.

Assuming that the voltage of generator 10 increases to the desired value before the voltage of any of the other generators increases to this value, the operating winding 45 of the reverse current relay 32 is energized over a circuit which has been described, including conductor 59 and contact members 53d of the load dispatching relay 53.

The relay 32 is thus closed, and the holding circuit for its winding 45 is established through contact members 32a and conductor 81 to ground. This circuit will hold the relay 32 closed after its initial operating circuit has been interrupted by the load dispatching relay 53, as will be described later.

The closure of relay contact members 32b establishes an energizing circuit for the main contactor 31 which extends from the positive terminal of generator 10 through conductor 82, control switch 41, conductor 83, contact members 32b, conductor 84, winding 85, and conductors 86 and 81 to ground.

The closure of the main contactor 31 connects the generator 10 to the load bus 14 through contact members 31a.

The closure of contact members 32c establishes an energizing circuit for the load dispatching relay 53 which extends from the energized conductor 82 through switch 41, conductor 83, contact members 32c, conductor 87, closed contact member 68a of the auxiliary trip relay, and operating winding 54 of the load dispatching relay 53 to ground.

Upon energization of the load dispatching relay 53, it functions to open all of its contact members, and the opening of contact members 53a, 53b, and 53c renders the relay switches 29, 28, and 27, respectively, ineffective to connect their associated generators to the load bus. It will be recalled that closure of contact members 32a of relay 32 established a holding circuit for this relay so that it remains closed regardless of the opening of contact members 53d of the load dispatching relay.

So long as the total current demanded by the load does not exceed a predetermined value, generator 10 functions alone to supply the load. As soon, however, as this total load increases above this predetermined value, the voltage drop across resistor 16 becomes sufficient to operate the auxiliary trip relay 68 to its open position.

When this occurs, the opening of contact member 68a of the auxiliary trip relay interrupts the energizing circuit for the load dispatching relay 53, and this relay is deenergized and closes its contact members 53a, 53b, etc.

The result of the operation of the load dispatching relay is to render all of the other relay switches 27, 28, and 29 effective to connect their associated generators to the load bus as soon as their output voltages exceed the voltage of the bus. These generators may be connected to the load bus in any order depending upon their output voltages reaching a predetermined value.

The system continues to operate with all of the generators connected to the load bus so long as the total load current exceeds the predetermined value which caused the auxiliary trip relay 68 to open. Under these operating conditions, the voltage regulators 21, 22, etc., of the generators function to not only control the voltages of their respective generators but also to maintain a relatively stable operating condition by maintaining a predetermined load division between the generators.

As soon, however, as the total load again decreases below the predetermined value, for which the auxiliary trip relay 68 is adjusted, it will again close its contact member 68a to reenergize the load dispatching relay 53. The relay 53 thus opens all of its contact members to interrupt the main operating circuits of all the reverse current relays.

It will be apparent, however, that the reverse current relays are all being held in through their respective holding circuits established by contact members 32a, 34a, 36a, and 38a. When the total load is below this predetermined value, the paralleling control of the regulators becomes ineffective to the extent that the several generators begin to divide the load unequally which causes a reverse power flow therebetween. As soon as a reverse power flow occurs between any two generators, the reverse current relay of one of the generators will automatically function to disconnect its associated generator from the load bus. This operation continues until all of the generators except one are disconnected from the load bus, in which event the system is returned to its initial operating condition.

Once these generators have been disconnected from the load bus, they cannot be reconnected until the total load increases to such value as to again operate the auxiliary trip relay to its open position. In view of this, it will be apparent that the control provides for positively disconnecting all of the generators but one from the load bus under light or no-load conditions, and in so doing prevents the reverse current relays 32, 34, etc., from being subjected to such operation as to cause damage thereto. In other words, the system so functions as to always connect only one generator to the load bus so long as the total load current does not exceed a predetermined value.

In view of the foregoing detailed description of a preferred embodiment of my invention, it will be apparent that I have provided for effectively controlling the parallel operation of a plurality of generators connected to supply a common load in such manner that these generators are operated in parallel only under such load conditions that their associated voltage regulators will properly control their parallel operation. This is accomplished through the use of a single load dispatching relay which functions to control the effectiveness of the relay switches which include the reverse current relays, and a single auxiliary trip relay which is responsive to one or more of the generator load currents and which functions to control the operation of the load dispatching relay.

While I have disclosed a particular embodiment of my invention, it will be apparent to those skilled in the art that various changes may be made therein without departing from the principles of the invention.

I claim as my invention:

1. In combination, a plurality of direct-current generators for supplying power to a common load bus, relay switch means individual to each generator operable to connect its associated generator to the load bus in response to a predetermined output voltage of the generator, electrically-interconnected regulator means individual to each generator, and relay means jointly responsive to the operation of any one of said relay switch means and the load of its associated generator operable to prevent the connection of more than one of said generators to the load bus until the load exceeds a predetermined value.

2. In combination, a plurality of direct-current generators for supplying power to a common load bus, relay switch means individual to each generator operable to connect its associated generator to the load bus in response to a predetermined output voltage of the generator, electrically-interconnected regulator means individual to each generator, a load dispatching relay operable in response to the operation of any one of said relay switch means to render the remaining relay switch means ineffective to connect their associated generators to the load bus, and an auxiliary trip relay responsive to the load of a connected generator operable to effect the operation of the load dispatching relay to render said remaining relay switch means effective.

3. In combination, a plurality of direct-current generators for supplying power to a common load bus, relay switch means individual to each generator operable to connect its associated generator to the load bus in response to a predetermined output voltage of the generator, electrically-interconnected regulator means individual to each generator, a load dispatching relay common to all of said generators effective when in one operating position to render all of said relay switch means operable to connect their associated generators to the load bus and effective when in another operating position to render all of said relay switch means which have not operated ineffective to connect their associated generators to the load bus, an operating circuit for the load dispatching relay controlled by said relay switch means whereby said relay is actuated from said one operating position to said other operating position in response to the operation of any one of said relays to connect its associated generator to the load bus, and an auxiliary trip relay operable to further control said operating circuit in response to the load on a connected generator exceeding a predetermined value to effect the operation of said load dispatching relay to its said other operating position so that the remaining generators may be connected to the load bus only in the event that the load thereon exceeds said predetermined value.

4. In combination, a plurality of direct-current generators for supplying power to a common bus, relay switch means individual to each generator operable to connect its associated generator to the bus in response to a predetermined output voltage of the generator, electrically-interconnected regulator means individual to each generator, a load dispatching relay effective when in a deenergized position to establish initial operating circuits for said relay switch means and effective when in an energized position to interrupt said initial energizing circuits, an auxiliary trip relay having normally closed contacts, an energizing circuit for said load dispatching relay including said normally closed contacts and controlled by said relay switch means for energizing said load dispatching relay in response to the operation of any one of said switch means to connect its associated generator to the bus, and a plurality of energizing circuits for said auxiliary trip relay each individual to a generator for causing said relay to open its normally closed contacts in response to a predetermined load on any generator which has been connected to the bus and thus cause the load dispatching relay to render the remaining relay switch means effective to connect their associated generators to the bus.

5. In combination, a plurality of direct-current generators for supplying power to a common bus, each of said generators being provided with a voltage regulator having an equalizing winding, circuit means connecting said equalizing windings together and to their associated generators for causing said generators to maintain load division, said interconnected voltage regulators functioning primarily to maintain load division above a predetermined total load on the bus, relay switch means individual to each generator operable to connect its associated generator to the bus in response to a predetermined output voltage thereof, and relay means operable in response to the operation of any one of said relay switch means for rendering the remaining relay switch means ineffective to connect their associated generators to the line until after the load on the connected generator exceeds a predetermined value.

6. In combination, a plurality of direct-current generators for supplying power to a common bus, relay switch means individual to each generator operable to connect its associated generator to the common bus in response to a predetermined output voltage of the generator, regulator means individual to each generator for controlling the output voltage thereof, said regulator means being electrically interconnected to maintain load division between the generators, relay means common to all of said generators operable in response to the operation of any one of the relay switch means to render the relay switch means associated with the other generators ineffective to connect their associated generators to the bus, and additional relay means operable in response to a predetermined load current of the connected generator for effecting the operation of said relay means to render said relay switch means of the other generators effective to connect their associated generators to the bus.

7. A control system for a plurality of direct-current generators disposed to be connected to a common bus and having electrically interconnected voltage regulators for maintaining predetermined output voltages of the generators and load division therebetween the effectiveness of said interconnected regulators to maintain load division being limited principally to loads above a predetermined minimum value, comprising, relay switch means individual to each generator operable to connect their respective generators to the bus in accordance with their output voltages, and relay means common to all of said generators operable in response to the operation of any one of said relay switch means for rendering the remaining relay switch means ineffective.

8. The combination with a plurality of direct-current generators for supplying power to a common bus and having electrically interconnected voltage regulators and relay switches for connecting said generators to the bus under predetermined voltage conditions, of relay means operable in response to the operation of any one of the relay switches to connect its generator to the bus to render the remaining relay switches ineffective to connect their generators to the bus, and additional relay means operable in accordance with the load on the connected generator to cause said relay means to operate to again render the remaining relay switch means effective.

9. The combination with a plurality of direct current generators for supplying power to a common bus and having electrically interconnected voltage regulators and relay switches for connecting said generators to the bus under predetermined voltage conditions, of a load dispatching relay having contact members normally operative when the relay is deenergized to render all of the relay switches effective and operative when energized to render said relay switches ineffective, an energizing circuit for said load dispatching relay controlled by said relay switches, said energizing circuit being completed in response to the operation of any one of said relay switches, and an auxiliary trip relay responsive to load currents of said generators operable to open said energizing circuit whenever the load on any number of the generators exceeds a predetermined value.

10. In combination, a plurality of direct-current generators for supplying power to a common load bus, relay switch means individual to each generator operable to connect its associated generator to the load bus in response to a predetermined output voltage of the generator, electrically-interconnected regulator means individual to each generator, and relay means common to all of said generators operable in response to the operation of the first of said relay switch means to operate to connect its associated generator to the bus to so control the operation of the remaining relay switch means to prevent the connection of any of the other generators to the load bus so long as the load on the bus remains below a predetermined value.

OMAR C. WALLEY.

REFERENCES CITED

The following references are of record in the file of this patent:

FOREIGN PATENTS

| Number | Country | Date |
| --- | --- | --- |
| 253,561 | Great Britain | Feb. 24, 1927 |